: US010825311B2

(12) United States Patent
Taylor et al.

(10) Patent No.: US 10,825,311 B2
(45) Date of Patent: Nov. 3, 2020

(54) SMART PERSONAL PROTECTIVE EQUIPMENT

(71) Applicant: Wells Lamont Industry Group LLC, Skokie, IL (US)

(72) Inventors: Dalia Taylor, Midlothian, VA (US); Jeffrey L. Garascia, Dublin, OH (US); Vincenzo DiFatta, Wood Dale, IL (US)

(73) Assignee: Wells Lamont Industry Group LLC, Skokie, IL (US)

( * ) Notice: Subject to any disclaimer, the term of this patent is extended or adjusted under 35 U.S.C. 154(b) by 0 days.

(21) Appl. No.: 16/241,062

(22) Filed: Jan. 7, 2019

(65) Prior Publication Data
US 2019/0213856 A1 Jul. 11, 2019

Related U.S. Application Data

(60) Provisional application No. 62/615,333, filed on Jan. 9, 2018.

(51) Int. Cl.
*G08B 13/14* (2006.01)
*G08B 13/24* (2006.01)
*G07C 9/00* (2020.01)
*F16P 3/14* (2006.01)
(Continued)

(52) U.S. Cl.
CPC ............ *G08B 13/2462* (2013.01); *F16P 3/08* (2013.01); *F16P 3/147* (2013.01);
(Continued)

(58) Field of Classification Search
CPC ... G08B 13/2462; G08B 13/2454; F16P 3/08; F16P 3/147; G07C 9/00111;
(Continued)

(56) References Cited

U.S. PATENT DOCUMENTS 6,853,303 B2* 2/2005 Chen ...................... G08B 21/24
340/573.1
10,147,249 B1* 12/2018 Brady ................. G07C 9/00174
(Continued)

FOREIGN PATENT DOCUMENTS

EP 2653772 A1 10/2013

OTHER PUBLICATIONS

International Search Report and Written Opinion issued by ISA/EPO in connection with PCT/US2019/012623 dated Apr. 4, 2019.

*Primary Examiner* — Zhen Y Wu
(74) *Attorney, Agent, or Firm* — Levenfeld Pearlstein, LLC

(57) ABSTRACT

A lock-out, tag-out system for use with an appliance having a door includes a lock for controlling opening of the door. The lock has a locked state and an unlocked state. A controller is communicatively coupled to the lock. An automatic identification and data capture system includes a tag and a reader. The reader is communicatively coupled to the controller. When the reader receives a signal from the tag indicating the presence of the tag within an opening envelope, the reader communicates with the controller to transmit a signal to the lock to change the state of the lock from the locked state to the unlocked state. The tag is located on or in the personal protective equipment item. The system may include a second tag on the appliance, the signal of which is attenuated by a user's body and compared to the signal from the first tag to determine whether protective equipment is worn.

2 Claims, 1 Drawing Sheet

(51) Int. Cl.
*F16P 3/08* (2006.01)
*G07C 9/28* (2020.01)

(52) U.S. Cl.
CPC ..... *G07C 9/00182* (2013.01); *G07C 9/00309* (2013.01); *G07C 9/00714* (2013.01); *G07C 9/00896* (2013.01); *G07C 9/28* (2020.01); *G08B 13/2454* (2013.01); *G07C 2209/63* (2013.01)

(58) Field of Classification Search
CPC ............ G07C 9/00182; G07C 9/00309; G07C 9/00714; G07C 9/00896; G07C 2209/63
USPC ....................................................... 340/572.1
See application file for complete search history.

(56) References Cited

U.S. PATENT DOCUMENTS

| | | | |
|---|---|---|---|
| 10,212,553 B1* | 2/2019 | Ambha Madhusudhana | H04W 4/027 |
| 10,373,408 B2* | 8/2019 | Trani | G07C 9/00571 |
| 2004/0100384 A1* | 5/2004 | Chen | G07C 9/28, 340/572.1 |
| 2006/0237427 A1* | 10/2006 | Logan | E05B 47/06, 219/401 |
| 2008/0121700 A1* | 5/2008 | Dearing | G07F 9/026, 235/381 |
| 2009/0251291 A1* | 10/2009 | Borcherding | G06K 7/10128, 340/10.1 |
| 2010/0045464 A1* | 2/2010 | Knopf | E04G 21/32, 340/573.1 |
| 2010/0140248 A1* | 6/2010 | Yi | F24C 7/087, 219/391 |
| 2011/0140970 A1* | 6/2011 | Fukagawa | G01S 13/765, 342/458 |
| 2015/0178532 A1* | 6/2015 | Brule | H01Q 7/00, 340/5.61 |
| 2015/0379791 A1* | 12/2015 | Russell | G07C 9/22, 340/5.61 |
| 2016/0371907 A1* | 12/2016 | Ma | E05B 17/10 |
| 2017/0061717 A1* | 3/2017 | Ouyang | G07C 9/00309 |

* cited by examiner

SMART PERSONAL PROTECTIVE EQUIPMENT

CROSS-REFERENCE TO RELATED APPLICATION DATA

This application claims the benefit of and priority to Provisional U.S. Patent Application Ser. No. 62/615,333, filed Jan. 9, 2018, titled "Personal Protective Equipment With Lock-Out, Tag-Out Features", the disclosure of which is incorporated herein in its entirety.

BACKGROUND

The present disclosure relates to "smart" personal protective equipment, or personal protective equipment with lock-out, tag-out features. More specifically, the present disclosure relates to personal protective equipment such as hand protection that communicates with equipment, such as kitchen appliances, for example ovens, to allow access to the equipment when the personal protective equipment is sensed and to lock out or prevent access to the equipment, e.g., the appliance, when the personal protective equipment is not sensed or not properly sensed.

Personal protective equipment, such as hand protection, for example, gloves and mittens, is commonly used in many industries. In the food service industry personnel are often working with high operating temperature equipment such a ovens and the like. Due to the fast pace of work in such environments, workers may forget or choose to not use protective equipment in order to assure proper kitchen operations such as expediting food preparation. As such, injuries can occur and may result in lost time accidents.

Accordingly, there is a need for a system to lock out access to certain equipment when a user is not properly protected. Desirably, such a system prevents access to equipment unless the use of personal protective equipment is sensed.

SUMMARY

A "smart" or lock-out, tag-out system is configured for use with an appliance having an access panel such as a door. The system includes a lock to control opening of the access panel or door. The lock has a locked state and an unlocked state. A controller is communicatively coupled to the lock.

For purposes of the present disclosure, and although it will be appreciated by those skilled in the art, a smart device or smart system is one in which the electronic device is connected to another device or devices or network or networks via a wireless protocol such as, but not limited to Bluetooth, NFC, Wi-Fi, LiFi (light-based communication), 3G and the like, and that may be able to operate to some extent interactively and autonomously.

In one example, an automatic identification and data capture system, such as an RFID system has a tag and a reader. The reader is communicatively coupled to the controller, such that when the reader receives a signal from the tag indicating the presence of the tag within an opening envelope, the reader communicates with the controller to transmit a signal to the lock to change the state of the lock from the locked state to the unlocked state. The tag is located on or in a personal protective equipment item such as a glove or mitt.

In an embodiment, the tag is an RFID tag and the reader is an RFID reader. The tag can be a passive tag. In an embodiment, the controller is incorporated in the reader. Again, other forms of wireless communication may be used.

The personal protective equipment item can be a glove or a mitt and the tag is attached to glove or mitt, so that the door cannot be opened without the proper personal protective equipment within the opening envelope. The system can further include an override switch to change the state of the switch to the unlocked state so that the door can be opened without the tagged personal protective equipment in the opening envelope.

In an aspect, the tag is a first tag, and the system includes a second tag that also generates a signal. The second tag can be located on or in the appliance. The system can be configured such that the signal from the second tag is attenuated by a user's body and the controller compares a strength of the signal from the second tag with a strength of the signal from the first tag to determine a difference between the strength of the signal from the first tag and the strength of the signal from the second tag.

When the difference between the strength of the signal from the first tag and the strength of the signal from the second tag does not meet a predetermined threshold value, the controller will not transmit a signal to the lock to change the state of the lock from the locked state to the unlocked state. That is, the system will prohibit access to, or lock out the equipment when the predetermined threshold value is not met.

Other aspects, objectives and advantages will become more apparent from the following detailed description when taken in conjunction with the accompanying drawings.

DETAILED DESCRIPTION

Figure 1:
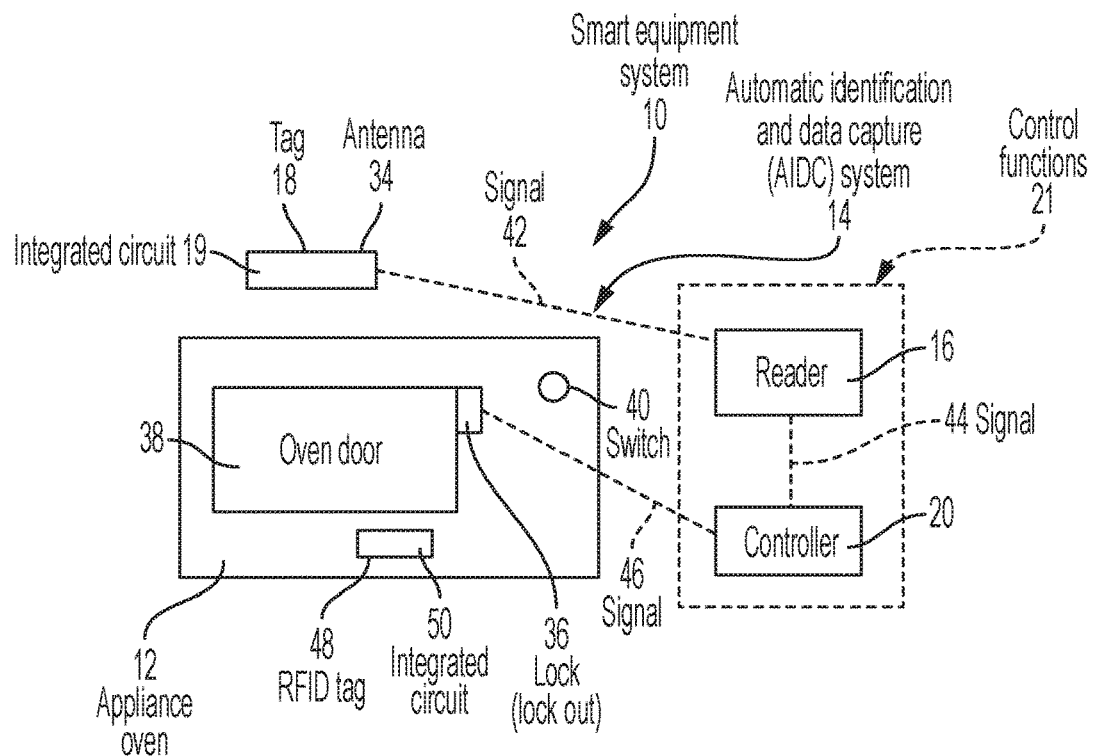
FIG. 1 is an illustration of an embodiment of a glove having a smart or lock-out tag-out feature.
Figure 2:
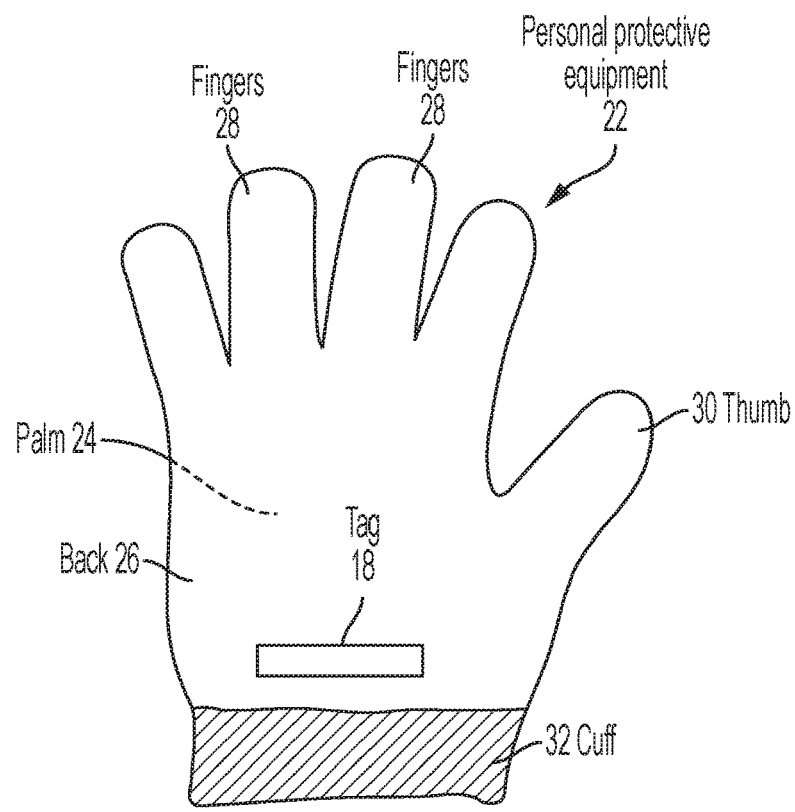
FIG. 2 is an illustration of an embodiment of a system having a smart or lock-out feature.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

Referring now to the figures and in particular to FIG. 1 there is shown an embodiment a smart equipment system 10 that includes a lock-out tag-out system or feature. In one embodiment, the system 10 is an oven system that includes an oven 12 and an automatic identification and data capture (AIDC) system 14. The AIDC system 14 can be, for example, a radio-frequency identification (RFID) system that has a reader 16 and a tag 18—an RFID tag. The system 14 may further include a controller 20. Wireless tags 18 can use other wireless protocols such as, but not limited to Bluetooth, NFC, Wi-Fi, LiFi (light-based communication), 3G and the like. Such tags 18 may be able to operate to some extent interactively and autonomously may be used.

The tag 18, for example, the RFID tag can be positioned in an item of personal protective equipment, such as a glove, a mitt, an apron, safety glasses and the like. In one example, a glove 22 provides thermal protection for a user's hand and wrist. A typical glove 22 used in the food service industry includes a palm 24, a back 26, three to five fingers 28, a thumb 20, and may include a cuff 32. The glove 22 may include an elongated cuff that forms a sleeve so as to protect a user's forearm. The tag 18 can be sewn or otherwise mounted to the glove 22 at, for example, the back 26 or the cuff 32.

In an embodiment the RFID tag 18 is a passive tag. The tag 18 operates in conjunction with the reader 16, which sends a signal, as indicated at 42, to the tag 18 and reads the tag's response. Such a passive tag 18 uses the radio energy transmitted by the reader 16. Active tags may also be used if desired. Those skilled in the art will understand the functioning of such an RFID system 14. A typical RFID tag 18 contains an integrated circuit 19 for storing and processing information to modulate and demodulate radio-frequency signals from the reader, a way in which to collect power from the reader signal, and an antenna 34 for receiving and transmitting the signals 42.

In an embodiment of the system 14, the reader 16 is configured to transmit a signal, as indicated at 44, to indicate the presence of the tag 18. In an embodiment reader 16 transmits the signal 44 to the controller 20.

The system includes a lock 36 (or lock-out) associated with the equipment item, e.g., the oven 12. That is, the oven 12 includes a physical lock device to prevent access to its interior. For example, the oven 12 can include a lock 36, such as an electro-mechanical lock on the oven door 38. The lock 36 operates in conjunction with the controller 20 such that when the controller 20 receives the signal 44 from the reader 16 that the tag 18 is in proper position (within an opening envelope) relative to the reader 16, the controller 20, in turn generates a signal, as indicated at 46, to the lock 36 to unlock and thus to allow the oven door 38 to be opened. It will be appreciated that the controller 20 need not be a separate component from the reader 16, but that the control functions can be incorporated into the reader, as indicated at 21.

The lock 36 default state is locked to prevent access to the interior of the oven 12. When the user attempts to open the oven 12 without a glove 22 or with a glove that does not include the tag 18, the system 10 prevents opening the oven 12. When the user attempts to open the oven 12 with a glove 22 that includes the tag 18, so long as the tag 18 is sensed within certain a distance from the reader 16, or within the opening envelope, the controller will generate the signal 46 to open the lock, allowing access to the oven 12.

The reader 16 can be located on the oven 12, on the oven door 38, or any other such location so that the reader 16 can sense when the tag 18 is within the opening envelope.

The system 10 can include an unlock scheme so that in the event the glove 22 cannot be located or in an emergency, the oven 12 can be unlocked by positive user action. For example, a switch 40 (a push-button switch or the like) can be located on the oven 12 to override the reader 16/controller 20 and lock 36 so that the oven door 38 can be opened without the reader 16 sensing the presence of the tag 18.

In an aspect, the system 10 may also be configured to ensure that the personal protective equipment, for example, the glove 22, is properly on the user. For example, the system 10 can be configured such that the glove 22 is properly on the user's hand. In such a configuration, a second RFID tag 48 (also containing an integrated circuit 50) can be positioned on or in the appliance (for example, the glove 22). The second RFID tag 48, which can operate on the same wireless principle as the first tag 18, is positioned so that the second tag's signal is attenuated by the user's body. The signal strength from the second tag 48 can then be compared to the signal strength of the first tag 18. If the difference in strength between the signals of the first and seconds tags 18, 48 is not sufficient (that is, does not meet a certain predetermined threshold value), the system 10 can be configured (e.g., through the controller 20) to determine that the personal protective equipment (e.g., the glove 22) is not properly worn by the user and as such prohibit access to, or lock out the equipment (e.g., the oven 12).

Although the lock-out tag-out system 10 is described as used with an oven 12, other equipment items/appliances with which the system can be used will be appreciated by those skilled in the art. In addition, AIDC systems 14 other than RFID system are also contemplated. Furthermore, although the disclosed system contemplates use of the tag 18 on a glove or mitt 22, the tag 18 can be positioned on a wide variety of personal protective equipment, including, gloves, mitts, aprons, protective eye wear, sleeves and the like for which access is to be controlled, all of which are within the scope and spirit of the present disclosure. The lock-out tag-out system 10 may also be configured such that sensing multiple tags may be required to unlock the oven 12 or other equipment/appliance item.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that the relative directional terms such as sides, upper, lower, top, bottom, rearward, forward and the like are for explanatory purposes only and are not intended to limit the scope of the disclosure.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A lock-out, tag-out system for use with an appliance having a door, comprising:
   a lock for controlling opening of the door, the lock having a locked state and an unlocked state;
   a controller communicatively coupled to the lock;
   an automatic identification and data capture system having a first tag and a reader, the reader communicatively coupled to the controller, wherein when the reader receives a signal from the first tag indicating the presence of the first tag within an opening envelope, the reader communicates with the controller to transmit a signal to the lock to change the state of the lock from the locked state to the unlocked state;
   a personal protective equipment item, wherein the first tag is located on or in the personal protective equipment item;
   a second tag, the second tag generating a signal,
   wherein the second tag is located on or in the appliance, and wherein the signal from the second tag is attenuated by a user's body and wherein the controller compares a strength of the signal from the second tag with a strength of the signal from the first tag to determine a difference between the strength of the signal from the first tag and the strength of the signal from the second tag.

2. The system of claim 1, wherein when the difference between the strength of the signal from the first tag and the strength of the signal from the second tag does not meet a predetermined threshold, the controller will not transmit a signal to the lock to change the state of the lock from the locked state to the unlocked state.

\* \* \* \* \*